United States Patent
Arenson, deceased

[11] 3,746,079
[45] July 17, 1973

[54] METHOD OF VAPORIZING A LIQUID STREAM

[75] Inventor: Edwin M. Arenson, deceased, late of El Reno, Okla. by Gloria W. Arenson, executrix

[73] Assignee: Black, Sivalls & Bryson, Inc., Oklahoma City, Okla.

[22] Filed: Jan. 21, 1972

[21] Appl. No.: 219,655

[52] U.S. Cl.................................. 165/1, 165/105
[51] Int. Cl............................................ F28d 15/00
[58] Field of Search....................... 165/1, 105, 111

[56] References Cited
UNITED STATES PATENTS
2,924,635  2/1960  Narbut............................... 165/105

Primary Examiner—Charles Sukalo
Attorney—Jerry J. Dunlap, C. Clark Dougherty, Jr., et al.

[57] ABSTRACT

The present invention relates to an improved method of vaporizing a liquid stream. A liquid stream is passed within a heat exchanger in heat exchange relationship with a stream of heating medium vapor so that the liquid stream is vaporized and at least a portion of the heating medium vapor is condensed. A controlled rate of inert gas is combined with the heating medium vapor so that the rate of heat transfer from the condensing heating medium vapor to the vaporizing liquid is restricted and maintained below the rate of heat transfer at which vapor-binding of the liquid occurs.

12 Claims, 3 Drawing Figures

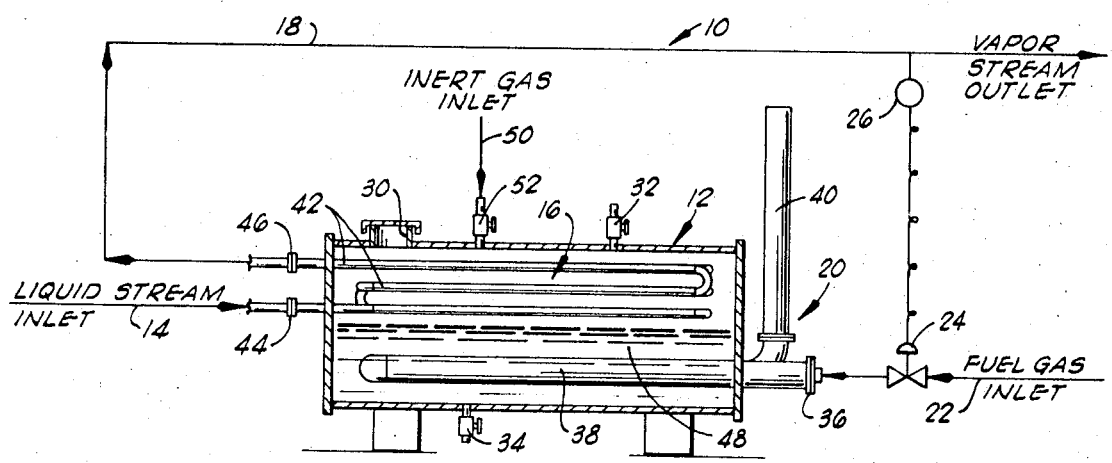
FIG. 1
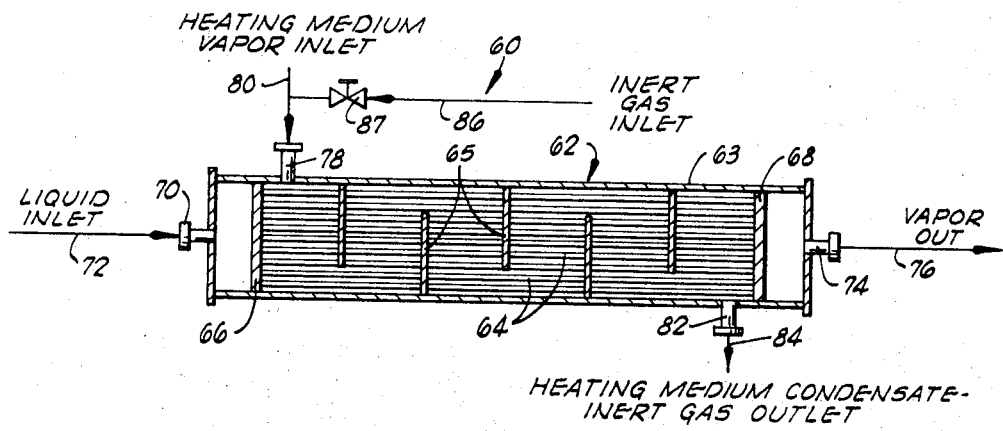
FIG. 2
FIG. 3

METHOD OF VAPORIZING A LIQUID STREAM

BACKGROUND OF THE INVENTION

1. Field of the Invention

The present invention relates generally to methods of vaporizing liquid streams, and more particularly, but not by way of limitation, to methods of vaporizing a liquid stream wherein heat is exchanged between the liquid stream and a heating medium vapor so that the liquid stream is vaporized and the heating medium vapor is condensed.

2. Description of the Prior Art

Heretofore, many various methods of vaporizing liquid streams have been developed and used. One very commonly used method, particularly in relatively large processing plants such as gasoline plants, refineries, chemical plants, etc., is to pass the stream of liquid to be vaporized through a heat exchanger in heat exchange relationship with a heating medium vapor. For example, most processing plants of the type mentioned above utilize steam as a source of energy both for providing power for turbine-driven pumps, blowers, etc. and as a source of heat. Consequently, the vaporization of various liquid streams within such plants is carried out by exchanging heat between steam and the liquid streams.

A problem encountered in the vaporization of liquid streams by exchange of heat with condensing heating medium vapor is the occurrence of "vapor-binding." When heat is transferred to a boiling liquid contained within heating tubes at too high a rate, a layer of vapor forms adjacent to and around the entire inside periphery of the tubes forming an insulating barrier between the tube walls and the liquid passing therethrough. This condition, known in the art as vapor-binding, results in a decrease of heat transfer to the liquid, nd consequently, the boiling process within the tubes is unstable and uneven. Due to the very high heat transfer rate between condensing vapor on the outside of heating tubes and boiling liquid within the tubes, vapor-binding readily occurs.

Heretofore, in order to make allowance for the occurrence of vapor-binding in heat exchange apparatus utilized for vaporizing liquid streams with condensing heating medium vapor, apparatus having extra heating tube surface area has been used, making the apparatus relatively expensive. Further, stable operating conditions are difficult to achieve in heat exchange apparatus even with excess heating tube surface area.

By the present invention, a method of vaporizing a liquid stream by exchange of heat with a condensing heating medium vapor is provided which may be carried out in relatively inexpensive heat exchange apparatus, and which results in the stable operation thereof.

SUMMARY OF THE INVENTION

The present invention relates to a method of vaporizing a liquid stream comprising the steps of passing the liquid stream within a heat exchanger in heat exchange relationship with a stream of heating medium vapor so that the liquid stream is vaporized and at least a portion of the heating medium vapor is condensed, and combining a controlled rate of inert gas with the heating medium vapor so that the rate of heat transfer from the condensing heating medium vapor to the vaporizing liquid is controlled and maintained below the rate of heat transfer at which vapor-binding of the liquid occurs.

It is, therefore, a general object of the present invention to provide a method of vaporizing a liquid stream.

A further object of the present invention is the provision of a method of vaporizing a liquid stream by exchange of heat with a condensing heating medium vapor which may be carried out in inexpensive heat exchange apparatus and which achieves stable operation.

Yet a further object of the present invention is the provision of a method of vaporizing a liquid stream by heat exchange with a condensing vapor wherein vapor-binding of the liquid is prevented and wherein the heat transferred to the liquid being vaporized may be maintained at a constant level as fouling of the heat exchanger occurs.

Other and further objects, features and advantages of the present invention will be readily apparent to those skilled in the art from the following detailed description of preferred embodiments of the invention given for the purpose of disclosure and taken in conjunction with the accompanying drawings.

BRIEF DESCRIPTION OF THE DRAWINGS

FIG. 1 illustrates a system for carrying out the method of the present invention in diagrammatic form, which system includes a steam generator shown partially in cross-section, FIG. 2 illustrates a system for carrying out the method of the present invention in diagrammatic form, which system includes a heat exchanger shown partially in section, and FIG. 3 is a curve illustrating the relationship between the quantity of inert gas contained in steam used to vaporize liquid propane and the rate of heat transfer to the liquid propane.

DESCRIPTION OF THE PREFERRED EMBODIMENTS

Referring now to the drawings, and particularly FIG. 1, a system including a steam generator apparatus 12 which may be used for carrying out the method of the present invention is illustrated and generally designated by the numeral 10. A stream of liquid to be vaporized is conducted to a heating coil 16 disposed within the steam generator apparatus 12 by a conduit 14. As the liquid stream passes through the heating coil 16 it is heated and vaporized. The resulting vapor is conducted from the heating coil 16 by way of a conduit 18 to a point of use. The steam generator apparatus 12 includes a conventional fuel gas burning assembly 20 for providing heat thereto. Fuel gas is supplied to the apparatus 20 by way of a conduit 22 having a conventional fuel gas control valve 24 disposed therein. A conventional temperature controller 26 is operably connected to the control valve 22 for controlling the rate of fuel entering the assembly 20 and the resultant heat input to the steam generator 12. The steam generator apparatus 12 is of conventional construction and basically comprises a closed vessel 28 having a water fill connection 30 disposed in the top portion thereof, and having a vent valve 32 and a water drain valve 34 connected thereto. The fuel gas burning assembly 20, previously mentioned, comprises a conventional burner apparatus 36 connected to one end of a conventional U-tube fire box 38 disposed within the lower portion of the vessel 28. The ends of the fire box 38 pass through and are seal welded to one end of the vessel 28, and a stack 40 is connected to the end of the fire box 38 opposite the burner 36. The heating coil 16 is comprised of a plurality of serially connected heating tubes 42 and is disposed in the upper portion of the vessel 28. The ends of the heating coil 16 pass through and are seal welded to an end of the vessel 28, and conventional flange connections 44 and 46 are connected thereto. The flange connection 44 is connected to the conduit 14 and the flange connection 46 is connected to the conduit 18. A body of water 48 is contained within the vessel 36 in the lower portion thereof. A conduit 50 which is connected to a source of inert gas such as nitrogen is connected to the upper portion of the vessel 28 and a valve 52 is disposed therein.

OPERATION OF THE SYSTEM 10

The vessel 28 of the apparatus 12 is filled with water by way of the fill connection 30 to a level between the fire box 38 and heating coil 16 so that the fire box 38 is completely submerged in the resulting body of water 48. Fuel gas is passed by way of conduit 22 into the fuel burner 36 and combusted. The resulting products of combustion pass through the fire box 38 and out the stack 40. As the hot products of combustion pass through fire box 38, heat is transferred from the products of combustion through the walls of the firebox 38 into the body of water 48. As a result, a portion of the water is vaporized, and the vapors pass upwardly into the upper portion of the vessel 28 around the heating tubes 42 of the heating coil 16. Air is removed from the vessel 28 after the apparatus 12 is initially started up by opening vent valve 32. Once all the air has been vented from the vessel 28 vent valve 32 is closed.

A stream of liquid to be vaporized is passed by way of conduit 14 into the heating coil 16. As the liquid passes through the heating tubes 42 of the heating coil 16, heat is transferred from the heating medium vapor on the outside of the tubes to the liquid passing through the inside of the tubes causing the liquid to be heated and vaporized. The resulting vapor passes out of the heating coil 16 into the conduit 18 from where it is conducted to a point of use.

As will be understood, the water vapor or steam on the outside of the heating coil 16 condenses on the outside walls of the heating tubes 14 and passes by gravity back to the body of water 48 contained within the vessel 28. Thus, in operation, steam is continuously generated from the body of water 48, condensed on the heating coil 16 and returned to the body of water 48. Due to the fact that heat is transferred from a condensing vapor on the outside of the heating tubes 42 to a boiling liquid within the heating tubes 42, the resistance to heat transfer is very low and a high rate of heat is transferred to the liquid being vaporized.

The filming characteristics of various heat transfer materials are known in the art and are characterized or indexed under what is known as the "heat transfer coefficient." The heat transfer coefficient varies inversely with the resistance to heat transfer for a particular material and directly to the rate of heat transfer. That is, the less resistance to heat transfer imposed by the material, the higher the heat transfer coefficient and the higher the rate of heat transferred through the material. Generally, the heat transfer coefficient for condensing vapor on the outside of heating tubes is very high. For example, condensing steam exhibits a heat transfer coefficient of approximately 1,000 to 3,000 btu/hr-ft$^2$-° F. Further, boiling liquid on the inside of heating tubes exhibits a very high heat transfer coefficient. For example, vaporizing or boiling propane exhibits a heat transfer coefficient of from about 1,000 to 4,000 btu/hr-ft$^2$-° F. This, in the application where heat is transferred from a condensing vapor to a boiling liquid, as for example from condensing steam to boiling propane, the rate of heat transfer is very high and vapor-binding of the boiling liquid readily occurs.

By the present invention, the rate of heat transfer to the boiling liquid is reduced and controlled at a rate just below the rate at which vapor-binding occurs. This is accomplished by diluting the heating medium vapor with an inert gas thereby increasing the resistance to heat transfer on the outside of the heating tubes, i.e., decreasing the heat transfer coefficient. Stated another way, the rate of heat transferred from the condensing heating medium vapor is reduced by the presence of a controlled quantity of inert gas around the heating tubes.

In the system illustrated in FIG. 1, the method of the present invention is carried out by injecting a quantity of inert gas into the vapor space, i.e., the upper portion of the closed vessel 28 of the steam generator 12. That is, after the system 10 is initially started up, the valve 52 is open so that a quantity of inert gas is injected into the closed vessel 28. After a quantity of inert gas is injected into the vessel 28 sufficient to reduce the heat transfer from the condensing steam to the boiling liquid to a rate just below the rate at which vapor-binding occurs, the valve 52 is shut off. As will be understood, after the proper quantity of inert gas is injected into the closed vessel 28, the system 10 is operated without the occurrence of vapor-binding of the boiling liquid, and as a result a stable operation is achieved.

A preferred technique for determining the correct quantity of inert gas to be injected into the vessel 28 is as follows: After air has been vented from the vessel 28 of the apparatus 12, a small quantity of inert gas is injected into the vessel 28. The system 10 is then operated so that the liquid stream passing through the apparatus 12 is vaporized and superheated to a desired temperature. That is, the temperature controller 26 is set at a temperature at least several degrees above the saturated vapor temperature of the liquid being vaporized at the pressure at which the system 10 is operating. The stability of the vaporization process is then observed. If the temperature of the vapors passing through the conduit 18 varies appreciably, or if the liquid stream is not completely vaporized, it is known that vapor-binding is occurring. If so, additional inert gas is injected into the vessel 28 of the apparatus 12 and the observation step repeated. Inert gas is injected until the operation of the system 10 becomes stable and the liquid stream is completely vaporized and superheated to the desired temperature.

As is well understood, as heat exchange apparatus is operated over a period of time, the walls of the heating tubes become fouled. That is, dirt and other impurity materials are deposited on the inside and outside walls of the heating tubes forming a film of material resistant to heat transfer. By the present invention, as fouling of the heating tubes 42 in the apparatus 12 increases, the quantity of inert gas contained within the vessel 28 may be decreased to offset the fouling and maintain the rate of heat transferred to the liquid being vaporized at a constant rate. This is accomplished by opening the vent valve 32 so that a portion of the inert gas within the vessel 28 escapes to the atmosphere.

Referring now to FIG. 2, an alternate system which may be utilized for carrying out the improved method of the present invention is illustrated in diagrammatic form and generally designated by the numeral 60. The system 60 basically comprises a conventional shell and tube heat exchanger 62 having the liquid stream to be vaporized on the tube side and a heating medium, such as steam, connected to the shell side. The heat exchanger 62 basically comprises a closed shell 63 having a plurality of heating tubes 64 arranged therein. The heating tubes 64 may be arranged in a variety of ways so that the liquid to be vaporized passes through the inside of the heating tubes and heating medium vapor is passed on the outside of the tubes. For example, as shown in FIG. 2, the heating tubes may be connected in parallel between a pair of tube sheets 66 and 68. The tubes 64 pass through and are seal welded to the tube sheets 66 and 68, and the tube sheets are in turn seal welded to the inside of the shell 63. A liquid stream inlet connection 70 is provided in one end of the shell 63 which is connected to a conduit 72. A vapor outlet connection 74 is provided in the opposite end of the shell 63 connected to a conduit 76. A heating medium vapor inlet connection 78 is attached to the shell 63 and a conduit 80 is attached to the connection 78. A heating medium outlet connection 82 is provided connected to the shell 63, and a conduit 84 is connected thereto. A plurality of baffles 85 are disposed within the shell 63 which function to cause the heating medium passing on the shell side of the exchanger 62 to intimately contact the outside surfaces of the heating tubes 64. A conduit 86 connected to a source of inert gas is connected to the conduit 80 and a valve 87 is disposed in the conduit 86.

OPERATION OF THE SYSTEM 60

In operation of the system 60 a stream of heating medium vapor, such as saturated steam, is passed by way of the conduit 80 into the shell side inlet connection 78 of the heat exchanger 62. The heating medium vapor passes over and under the baffles 65 and around the heating tubes 64 disposed within the shell 63. A stream of liquid to be vaporized passes by way of conduit 72 into the tube side inlet connection 70 of the heat exchanger 62 and through the heating tubes 64. While passing through the heating tubes 64, the stream of liquid is heated and vaporized, and the resulting vapor stream passes out of the exchanger 62 by way of outlet connection 74 and conduit 76. As heat is transferred from the heating medium vapor on the shell side of the heat exchanger 62, it gives up heat through the walls of the heating tubes 64 to the liquid stream passing therethrough which causes the heating medium vapor to be condensed. The resulting condensate passes out of the shell 63 of the exchanger 62 by way of shell side outlet connection 82 and conduit 84.

In order to prevent vapor-binding of the boiling liquid passing through the tubes 64, a stream of inert gas is combined with the heating medium vapor by way of conduit 86. The presence of the inert gas combined with the heating medium vapor has the effect of reducing the rate of heat transfer to the liquid being vaporized in the same manner as described above for the system 10. However, as will be apparent, a continuous stream of inert gas must be combined with the heating medium vapor passing through the exchanger 62. The rate of inert gas required is determined in the same manner as described above for the system 10. That is, the rate of inert gas is increased until the visual signs of vapor binding in the heat exchanger 63 are eliminated. Once the correct rate is determined, a continuous stream of inert gas is combined with the heating medium vapor so that the rate of heat transfer is controlled at a level below the level at which vapor-binding occurs.

As described above for the system 10, as the heating tubes 64 within the heat exchanger 63 become fouled, the rate of inert gas combined with the heating medium vapor may be decreased to maintain the heat transfer rate at a constant level.

As will be readily apparent to those skilled in the art, the method of the present invention may be carried out utilizing a variety of apparatus other than the apparatus described herein. By the method of the present invention the heating tube surface area required in such apparatus will generally be less than that required to carry out comparable prior art methods, and more importantly, stable operation of the apparatus is achieved by the present invention through the elimination of vapor-binding problems.

While the heating tube surface area required by the method of the present invention to bring about the vaporization of a particular liquid stream is greater than that required by prior art methods due to the reduction in the heat transfer rate, since excess surface area is not required to allow for vapor-binding and fouling, less total area generally results.

In calculating the surface area required for a particular application of the present invention, conventional engineering techniques may be used utilizing what is known in the art as "partial condensing heat transfer coefficient." The partial condensing heat transfer coefficient for a particular heat exchange medium combined with various quantities of inert gas as well as the rate of heat transfer to a particular liquid stream to be vaporized may be determined. For example, referring to FIG. 3, the rate of heat transfer to vaporizing propane from condensing steam combined with various quantities of nitrogen are shown in graphical form. From FIG. 3 it may be seen that the rate of heat transfer to the propane decreases with increasing dilution of the steam with nitrogen.

The present invention, therefore, is well adapted to carry out the objects and attain the ends and advantages mentioned as well as those inherent therein. While presently preferred embodiments have been described for purposes of this disclosure, numerous changes will be readily apparent to those skilled in the art which are encompassed within this disclosure and the appended claims.

What is claimed is:

1. An improved method of vaporizing a liquid stream by exchange of heat with a heating medium vapor comprising the steps of:
   passing said liquid stream within a heat exchanger in heat exchange relationship with said stream of heating medium vapor so that the liquid stream is vaporized and so that at least a portion of the heating medium vapor is condensed; and
   combining a controlled rate of inert gas with said heating medium vapor so that the rate of heat transfer from the condensing heating medium vapor to the vaporizing liquid is controlled and maintained below the rate of heat transfer at which vapor-binding of the vaporizing liquid occurs.

2. The method of claim 1 which is further characterized to include the step of decreasing the rate of inert gas combined with said heating medium vapor in proportion to the increase in fouling of said heat exchanger.

3. The method vapor of claim 2 wherein the heating medium vapor is steam.

4. The method of claim 3 wherein the inert gas is nitrogen.

5. The method of claim 3 wherein the inert gas is air.

6. An improved method of vaporizing a liquid stream by exchange of heat with a heating medium vapor which comprises the steps of:
heating a body of heating medium liquid confined within a closed vessel so that a portion of said heating medium liquid is continuously vaporized;
passing said liquid stream within the closed vessel in heat exchange relationship with said heating medium vapor so that the liquid stream is vaporized and a portion of the heating medium vapor is continuously condensed; and
injecting a quantity of inert gas into said closed vessel, said quantity being sufficient to decrease the rate of heat transfer from the condensing heating medium vapor to the vaporizing liquid stream to a level such that vapor-binding of the vaporizing liquid stream is prevented.

7. The method of claim 6 wherein the heating medium is water.

8. The method of claim 7 wherein the inert gas is air.

9. The method of claim 7 wherein the inert gas is nitrogen.

10. In a method of vaporizing a liquid stream wherein the liquid stream is passed within a heat exchanger in heat exchange relationship with a stream of steam so that the liquid stream is vaporized and the steam is cooled and condensed, the improvement comprising:
diluting said stream of steam with a predetermined quantity of inert gas so that the rate of heat transfer from the steam to the vaporizing liquid stream is reduced to a level such that vapor-binding of the vaporizing liquid stream is prevented; and
reducing the dilution of the stream of steam with the inert gas in proportion to the increase in fouling of said heat exchanger.

11. The method of claim 10 wherein the inert gas is nitrogen.

12. The method of claim 11 wherein the inert gas is air.

* * * * *